(12) United States Patent
Spear (10) Patent No.: US 8,307,278 B1
(45) Date of Patent: Nov. 6, 2012

(54) TILING MECHANISM TO COMBINE WEB SERVICES

(75) Inventor: Matthew John Spear, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/245,849

(22) Filed: Sep. 26, 2011

(51) Int. Cl.
    *G06F 17/27* (2006.01)
(52) U.S. Cl. .................................................. 715/240
(58) Field of Classification Search ............ 715/240
    See application file for complete search history.

(56) References Cited

U.S. PATENT DOCUMENTS

| | | | |
|---|---|---|---|
| 6,523,022 B1* | 2/2003 | Hobbs ............................. | 1/1 |
| 2004/0210536 A1* | 10/2004 | Gudelj et al. ............... | 705/64 |
| 2009/0070190 A1* | 3/2009 | Gorty et al. ................. | 705/10 |

OTHER PUBLICATIONS

Smith, Matt, "How to Manage Tabs in Opera Like a Pro," http://www.makeuseof.com/tag/manage-tabs-opera-pro/, posted on Jun. 20, 2010, accessed on Apr. 11, 2011, 3 pages.
"Fox Splitter (formerly Split Browser) :: Add-ons for Firefox," https://addons.mozilla.org/en-US/firefox/addon/fox-splitter-formerly-split-br/, updated on Nov. 10, 2009, accessed on Apr. 8, 2011, 6 pages.
"HTML element," From Wikipedia, the free encyclopedia, http://en.wikipedia.org/wiki/HTML_element, last modified on May 17, 2011, accessed on May 20, 2011, 24 pages.
"HTML <iframe> Tag," w3schools.com, http://www.w3schools.com/tags/tag_iframe.asp, accessed on May 20, 2011, 3 pages.

* cited by examiner

*Primary Examiner* — Laurie Ries
*Assistant Examiner* — Tionna Smith
(74) *Attorney, Agent, or Firm* — Sterne, Kessler, Goldstein & Fox P.L.L.C.

(57) ABSTRACT

In many websites, there are multiple pages that a user may wish to view simultaneously. A system and method are provided that allow a user to divide a web browser screen to manage multiple documents, views of documents, and web services which are provided for and managed using inline frames.

19 Claims, 8 Drawing Sheets

TILING MECHANISM TO COMBINE WEB SERVICES

BACKGROUND

1. Field of the Invention

This field is generally related to managing web information access.

2. Related Art

In many websites, there are multiple pages one wishes to view simultaneously.

However, at best the website will allow one to view them in separate tabs, which makes referring to, for example, a document while writing an e-mail much harder.

Terminology related to this problem includes buffer, window, and workspace. For example, a buffer may refer to an actual document. A window may refer to a view of a buffer. Multiple windows may offer views of a single buffer, each window providing access to a different portion of the buffer. However, it is important that there be a synchronization mechanism to coordinate editing a single buffer from multiple windows.

The collection of windows and buffers which are currently being operated on by the user are referred to as the workspace. Offline programs, such as text editors, have developed ways to partition the screen that addresses the problem of referencing multiple documents simultaneously. For example, the UNIX text editor VIM provides a set of buffers, windows and tabs. The window can be split in any manner, allowing a user to view any set of buffers that is desired. However, in vim the tabs are not independent, in that there is a shared buffer list for the editor. Because of the shared buffer list, it slows down slightly the referring to buffers that are related to the current window. A buffer may be associated with multiple workspaces. Other offline programs may provide similar functionality in order to coordinate management of workspaces by handling buffers and views.

However, existing approaches have not provided for effective management of windows, buffers, and workspaces in web browsers by using the web browser feature of inline frames (i-frames). While certain browsers, such as Opera and Firefox, include the ability to manage views of documents, such as by tiling, existing approaches have not fully utilized the potential to manage windows, buffers, and workspaces by using the inline frames feature of HTML in order to manage content web pages in a master frame web page.

BRIEF SUMMARY

A computer-implemented method, system, and=computer-readable medium are provided for managing web information access. A web browser window is divided into a plurality of inline frames, defined by markup language instructions in a master frame web page, that partition the screen space available in the window. A first content web page is accessed from a web server. A view of the first content web page is displayed in a first inline frame of the master frame web page. At least one of a different view of the first content web page, a second content web page, and a web service frame is displayed in a second inline frame of the master frame web page. The inline frames are updated based on the markup language instructions so as to keep current at least one of the content web pages, the views of the content web pages, or the web service frame as a user interacts with the inline frames of the master frame web page.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
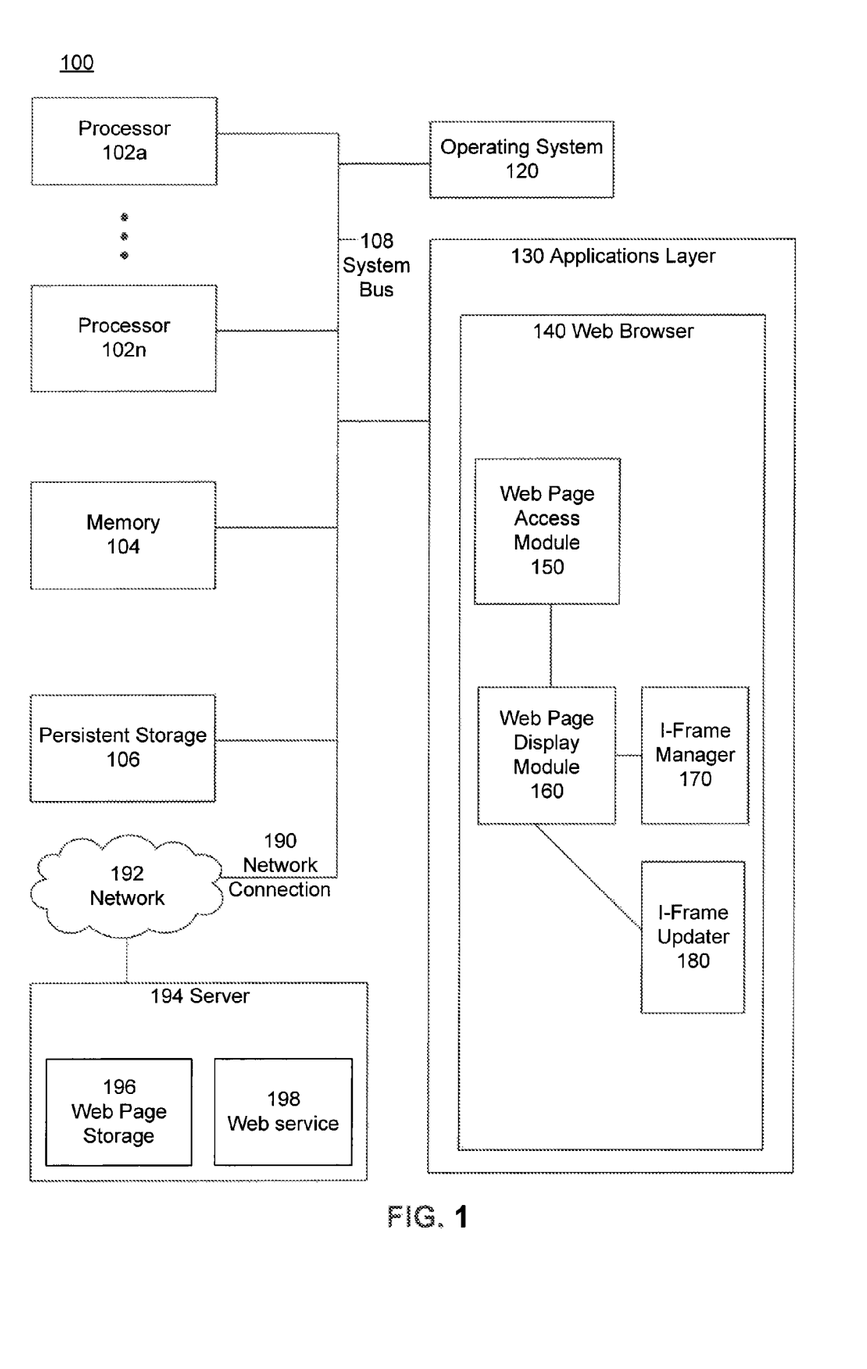
FIG. 1 is a diagram illustrating an exemplary system.

FIG. 1 is a diagram illustrating an exemplary system. Computing device 100 manages web information access.

The diagram of FIG. 1 illustrates computing device 100 that contains a combination of hardware, software, and firmware constituent parts that allow it to run an applications layer 130 with access to additional resources over a network 192 via a network connection 190. Computing device 100 may be a conventional computer such as a desktop or laptop PC, but it may additionally be any web-enabled peripheral such as a game console, a tablet, a netbook or a smartphone. Computing device 100 as shown in FIG. 1 may be organized around a system bus 108, but any type of infrastructure that allows the hardware infrastructure elements of computing device 100 to communicate with and interact with each other may be used to function as this part of computing device 100.

The processing task in the embodiment of FIG. 1 is carried out by one or more processors 102a . . . 102n, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102a . . . 102n for certain processing tasks.

In order to manipulate data, processors 102a ... 102n access a memory 104 via system bus 108. For data which needs to be stored more permanently, processors 102a ... 102n access persistent storage 106. Processors 102a ... 102n, memory 104 and persistent storage 106 operate in coordination with operating system 120 to provide basic functionality for computing device 100. Operating system 120 provides support functionality for applications layer 130.

Applications layer 130 includes several functional subsystems that are components of a web browser 140. The functional subsystems include a web page access module 150, a web page display module 160, an i-frame manager 170, and an i-frame updater 180. These subsystems interact with web content received via a network connection 190 from server 194 on network 192. Server 194 may be a web server that provides content that computing device 100 accesses. Specifically, server 194 may host a web page storage 196 and web services 198. The web page storage 196 and web services 198 may be accessed at web browser 140 using technologies such as HTTP. However, embodiments use i-frames in a new way that facilitates management of web information access, as discussed below.

In general, web browser 140 operates by providing an i-frame manager 170 that hosts a master frame web page that is partitioned into a plurality of inline frames. These inline frames are displayed by web page display module 160. Web page display module 160 accesses the appropriate content to fill the inline frames from server 194 connected to computing device 100 over network 192 via network connection 190. This content may include web pages from web page storage 196 and web service content 198. Meanwhile, i-frame manager 170 ensures that the appropriate content is directed to the appropriate i-frame, and i-frame updater 180 works in the background to synchronize the i-frames, so that each view of web content is kept up to date. I-frame updater 180 works to ensure that edits made in windows are reflected in relevant buffers, and web services reflect an updated version of the web service content. It does this by treating inline frames as documents within documents. Whenever an event that changes the contents of an i-frame occurs, whether it is due to user input or other changes of the i-frame, i-frame updater 180 intercepts the change. I-frame updater reflects the change appropriately in the relevant buffer, and causes web page display module 160 to display the change in all relevant i-frames in web browser 140.

Computing device 100 may use network connection 190 to communicate with other processing machines via network 192. Network connection 190 may be a wired connection such as Ethernet, token ring, or optical, DSL, cable, or phone connection in conjunction with an appropriate modem. Similarly, appropriate wireless technology may be used to act as network connection 190 to access network 192. Network 192 may be the Internet, a local area network, or any other network 192 of machines with which computing device 100 may exchange data. It is to be noted that computing device 100 may be connected by network 192 via network connection 190 to server 194 that provides web browser 140 with a source of content as discussed above.

Each of the constituent parts of a system embodiment may be implemented on any computing device 100. Such computing device 100 can include, but is not limited to, a personal computer, mobile device such as a mobile phone, workstation, embedded system, game console, television, set-top box, or any other computing device 100. Further, computing device 100 can include, but is not limited to, a device having a processor and memory for executing and storing instructions. Software may include one or more applications and an operating system. Hardware can include, but is not limited to, a processor, memory and graphical user interface display. Computing device 100 may also have multiple processors and multiple shared or separate memory components. For example, computing device 100 may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

Overview of the Method

Figure 2:
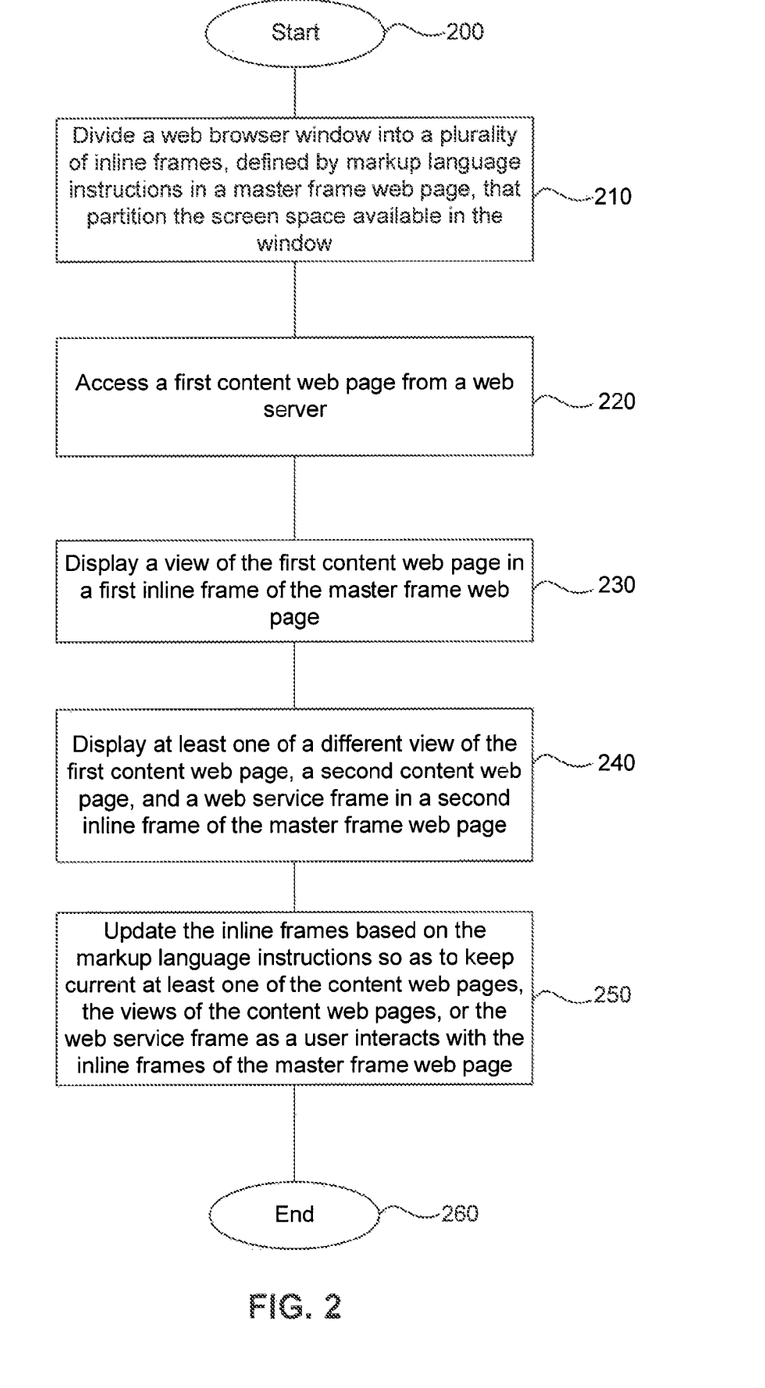
FIG. 2 is a flowchart of an exemplary method.

FIG. 2 is a flowchart of an exemplary method. The method is a computer-implemented method for managing web information access.

FIG. 2 begins at stage 200, Start.

In stage 210, a web browser window is divided into a plurality of inline frames, defined by markup language instructions in a master frame web page, that partition the screen space available in the window. Stage 210, in an exemplary embodiment, may be performed by i-frame manager 170 acting in web browser 140.

In stage 220, a first content web page is accessed from a web server. Stage 220 may be performed by web page access module 150 acting in web browser 140.

In stage 230, a view of the first content web page is displayed in a first inline frame of the master frame web page. Stage 230 may be performed by web page display module 160 acting in web browser 140.

In stage 240, at least one of a different view of the first content web page, a second content web page, and a web service frame is displayed in a second inline frame of the master frame web page. Stage 240 may be performed by i-frame manager 170 acting in web browser 140 in conjunction with web page access module 150 and web page display module 160.

In stage 250, the inline frames are updated based on the markup language instructions so as to keep current at least one of the content web pages, the views of the content web pages, or the web service frame as a user interacts with the inline frames of the master frame web page. Stage 250 may be performed by i-frame manager 170 acting in conjunction with i-frame updater 180 in web browser 140.

FIG. 2 ends at stage 260, End.

Examples of Use and Additional Features

The i-frames may be defined by use of an appropriate tag in markup language.

Example embodiments may use the <iframe> ... </iframe> tag, and the markup language may be HTML 4.01 or HTML 5. Other embodiments may use alternative tags to support i-frames, such as the <div> tag. An i-frame places another document defined by a URL (such as, for example, an HTML document) in a frame defined in a master frame document. An advantage of i-frames is that they may be the "target" frame for links defined by other elements, and i-frames may be selected by the user agent as the focus for printing, viewing its source, etc. The web browser will support i-frames.

For example, an inline frame may be marked up using the following HTML code:
Example HTML Code
<iframe src="page1.htm" width="100%" height="50%">
   <p>Your browser does not support iframes. </p>
</iframe>

This code creates an i-frame that covers the entire screen horizontally, and half of the screen vertically. The width and height attributes may be defined in pixels or as a percentage of the screen. Multiple i-frames may be positioned by using other HTML features, such as tables or stylesheets.

The src attribute is an attribute defined within the <iframe> tag that provides the browser with the appropriate Uniform Resource Locator (URL) of a document to display in the i-frame. A URL serves as an address for a network resource, and provides information about the location, name, and type of network resource. By using a URL, the i-frame knows where to access the information that it displays. In the Example HTML Code, the src attribute is set "page1.htm", so the i-frame defined by the tag displays the HTML file "page1.htm". Alternatively, i-frames may display alternative content that can be accessed by URLs, such as ASP (ActiveX Server Pages) or JSP (Java Server Pages) files. If the user's browser does not support frames, the text between the <iframe> and <iframe> tags will be displayed. In this example, a browser that does not support iframes will display, "Your browser does not support iframes." instead of page1.htm.

In order to manage inline frames, i-frame manager 170 will define i-frames appropriately by including <iframe> tags with appropriate attributes as parts of a master frame webpage. Specifically, the src attributes of the <iframe> tags may provide for access to various views of various web pages and various web services. I-frame updater 180 will ensure that the i-frames are updated. For example, if the user edits a document in an i-frame, i-frame updater 180 will update all i-frames that are views of that buffer. Similarly, if the web service 198 is a newsfeed, i-frame updater 180 will ensure that new news stories are displayed by web page display module 160 as they appear on server 194 at web service 198.

Figure 3:
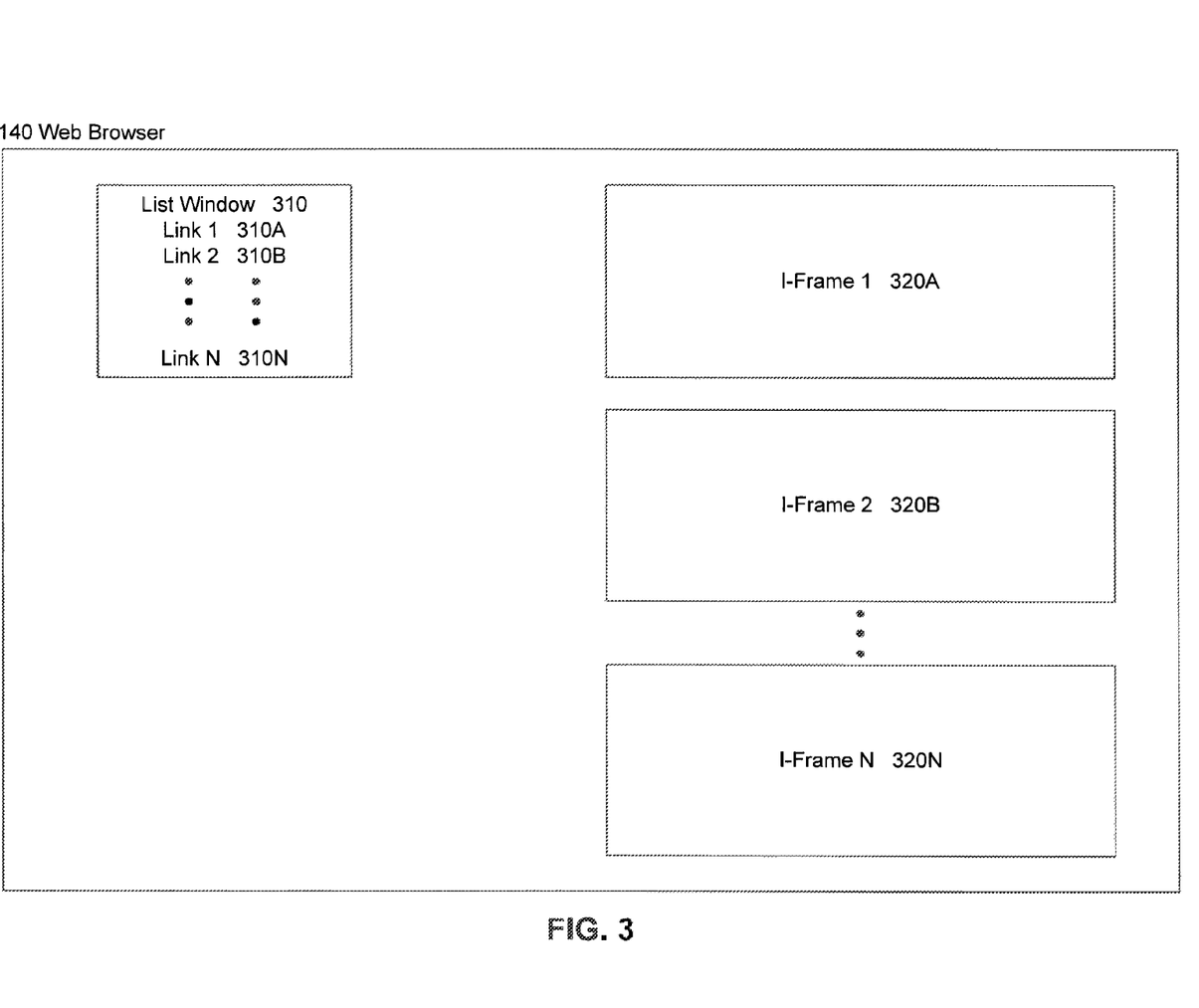
FIG. 3 is a diagram of a web browser that is configured with a list window that provides a list of links to frames.

An i-frame of the master frame web page may provide a list of the web documents of which views are provided by other i-frames. FIG. 3 is a diagram of web browser 140 that is configured with a list window 310 that provides a list of links to i-frames. The list window 310 may provide the user with access to the other documents. For example, the list may contain a set of hyperlinks that refer to the other documents, such as link 310A, link 310B . . . link 310N. I-frames correspond with the links, such that i-frame 320A corresponds to link 310A, i-frame 320B corresponds to link 310B, and so on up to i-frame 320N corresponding to link 310N. By clicking on one of link 310A, link 310B . . . link 310N, the i-frame corresponding to the appropriate link is activated for editing.

Figure 4:
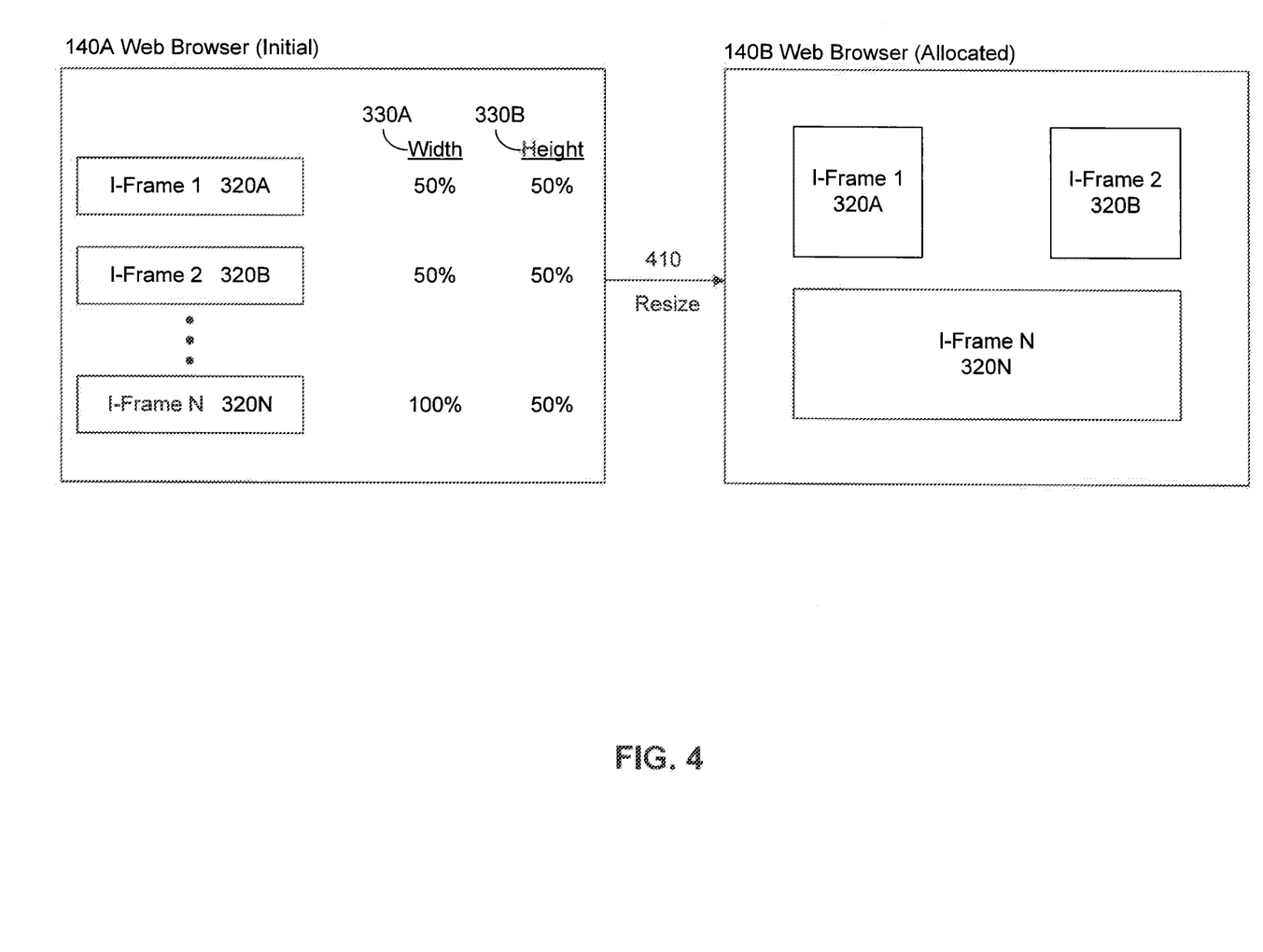
FIG. 4 is a diagram of how minimized frames may be expanded.

The display of the inline frames may be handled in various ways. FIG. 4 is a diagram of how minimized frames may be expanded. For example, the inline frames may be displayed as initially minimized. Then, the inline frames may be resized to allocate screen space to each inline frame.

For example, web browser 140A (initial) shows a set of i-frame 320A, i-frame 320B . . . i-frame 20N as minimized i-frames. Width 330A and height 330B provide the user with a form into which the user can enter the desired sizes of the i-frames. For example, i-frame 320A is designated as occupying 50% of the screen width and 50% of the screen height, i-frame 320B is designated as occupying 50% of the screen width and 50% of the screen height, and i-frame 320N is designated as occupying 100% of the screen width and 50% of the screen height. If one assumes that these are the only i-frames, the result may be a set of resized i-frames as in web browser 140B (as allocated). It should be noted that i-frames 320A, 320B . . . 320N are arranged so that they now divide the screen as provided for by a user. Space may be allocated in some embodiments on a first-come, first-served basis, such that if a user attempts to allocate more space than is available, the first requests are satisfied first, and then subsequent requests are given reduced space allocations if not enough space is available. In web browser 140B, there is a boundary of unused space around the i-frames of approximately 5% of the screen dimensions, but this boundary may vary from embodiment to embodiment and need not be present.

In order to resize the frames, what may occur is that width data 330A and height data 330B may be submitted as an HTML form to the web browser. Web page display module 160 then processes the width data 330A and height data 330B to develop an actual arrangement of i-frames in conjunction with i-frame manager 170. As noted previously, i-frame manager may use various layout markup, such as tables or style sheets, to position the inline frames appropriately.

Web page display module 160 then produces appropriate HTML code to reflect the new size of the i-frames, and accesses the contents of the i-frames from the server 194 over network 192 via network connection 190.

Figure 5:
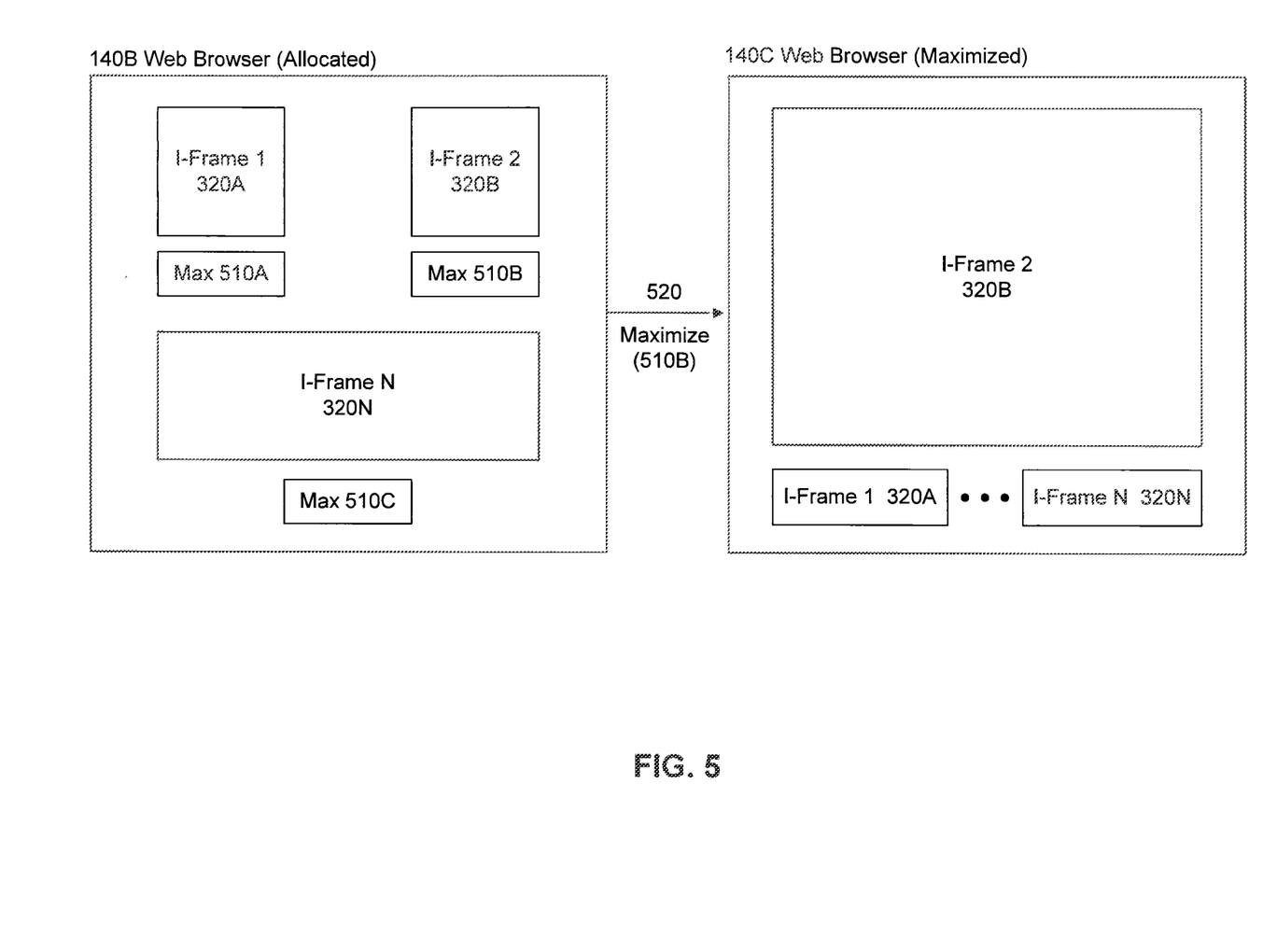
FIG. 5 shows how one of the frames may be maximized.

An alternative method of allocating space for the inline frames is to display web content in a selected maximized one of the inline frames. FIG. 5 shows how one of the frames may be maximized, according to an embodiment. Each of the i-frames i-frame 310A, i-frame 320B . . . i-frame 320N may be associated, in certain embodiments, with a max (maximize) button 510A . . . 510N. Suppose that maximize 510B is selected. This selection activates the maximization 520 of i-frame 320B. In this case, the selected one of the inline frames is displayed as maximized. Thus, in web browser 140C, i-frame 320B has been maximized, and all of the inline frames except for the maximized one are minimized to accommodate the maximized inline frame.

Figure 6:
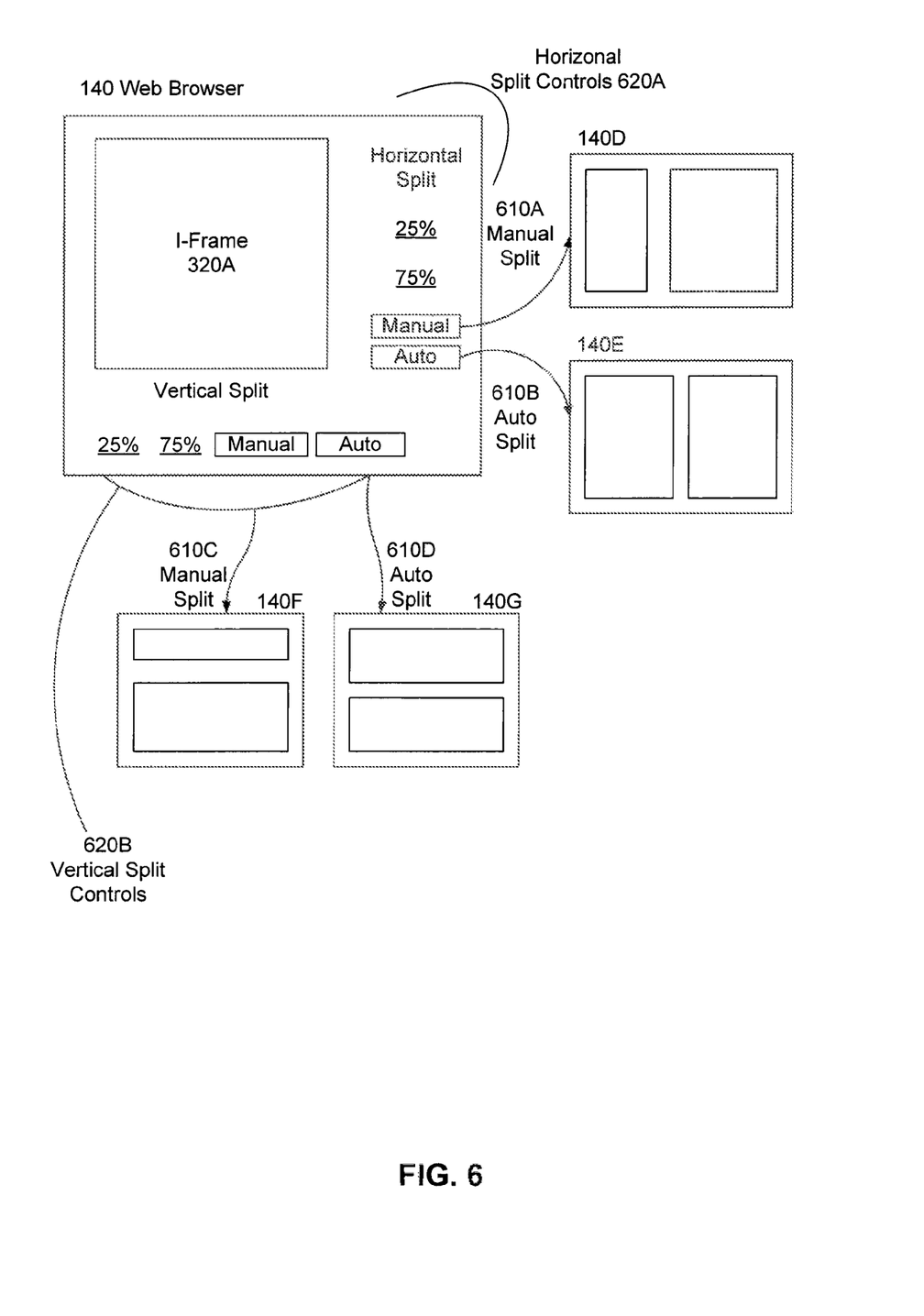
FIG. 6 shows how the i-frames may be split.

FIG. 6 shows how the i-frames may be split. For example, an instruction may be received to split an inline frame by dividing it into two smaller frames, whose size is set manually, on a horizontal or vertical basis. Web browser 140 may provide horizontal split controls 620A and vertical split controls 620B. An HTML form may allow a user to specify manually what size an i-frame should be split into. When splitting an i-frame, the i-frame is replaced by two smaller frames. In FIG. 6, 610A shows a manual horizontal split and 610C shows a manual vertical split of a maximized i-frame 320A, each partitioning i-frame 320A into manually split smaller frames that divide the screen on a 25%/75% basis.

Alternatively, an inline frame may be split automatically. In the case of an automatic split, the frame is split so as to evenly divide available screen space on a horizontal or vertical basis. For example, the auto split button may be selected from horizontal split controls 620A or vertical split controls 620B. This will lead to a horizontal auto split 610B or vertical auto split 610D, leading to web browser state 140E or 140G, such that the maximized window has been split evenly in two.

Figure 7:
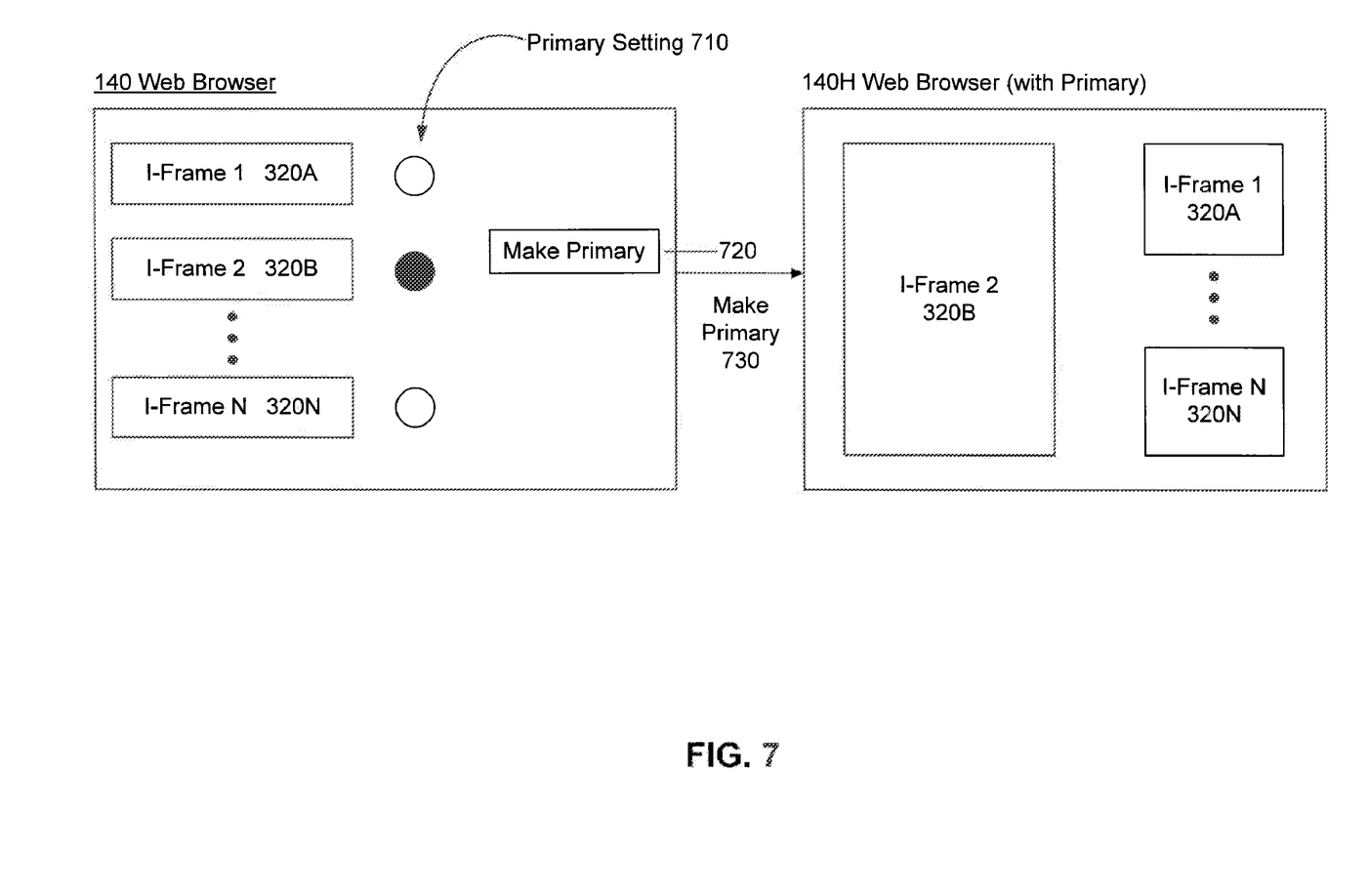
FIG. 7 shows the use of a primary frame.

Another method of partitioning the screen is to automatically split the inline frames, such that there is a primary frame of a set size, and the other frames divide any additional screen space. FIG. 7 shows the use of a primary frame. FIG. 7 includes a primary setting radio button 710 that specifies which of the i-frames 320A, 320B . . . 320N is to be the primary frame. After specifying this, the make primary button 720 causes the make primary processing 730 to occur. The result of primary processing is web browser with primary 140H. In web browser with primary 140H, i-frame 2 320B has been made primary, and therefore has been set to occupy the left half of the screen. The other i-frames, such as i-frame 1 320A and i-frame N 320N, have evenly subdivided the right half of web browser with primary 140H.

Another feature that embodiments may provide is a command-line interface that allows navigation of the contents of inline frames and loading new inline frames. Such a command-line interface may use the same syntax as a command-line operating system, such as UNIX or MS-DOS. The command-line interface may allow navigation through commands that provide listings of potential files that may be viewed, opening files, deleting files, saving files, and so on. The command-line interface may operate in conjunction with i-frame manager 170.

Figure 8:
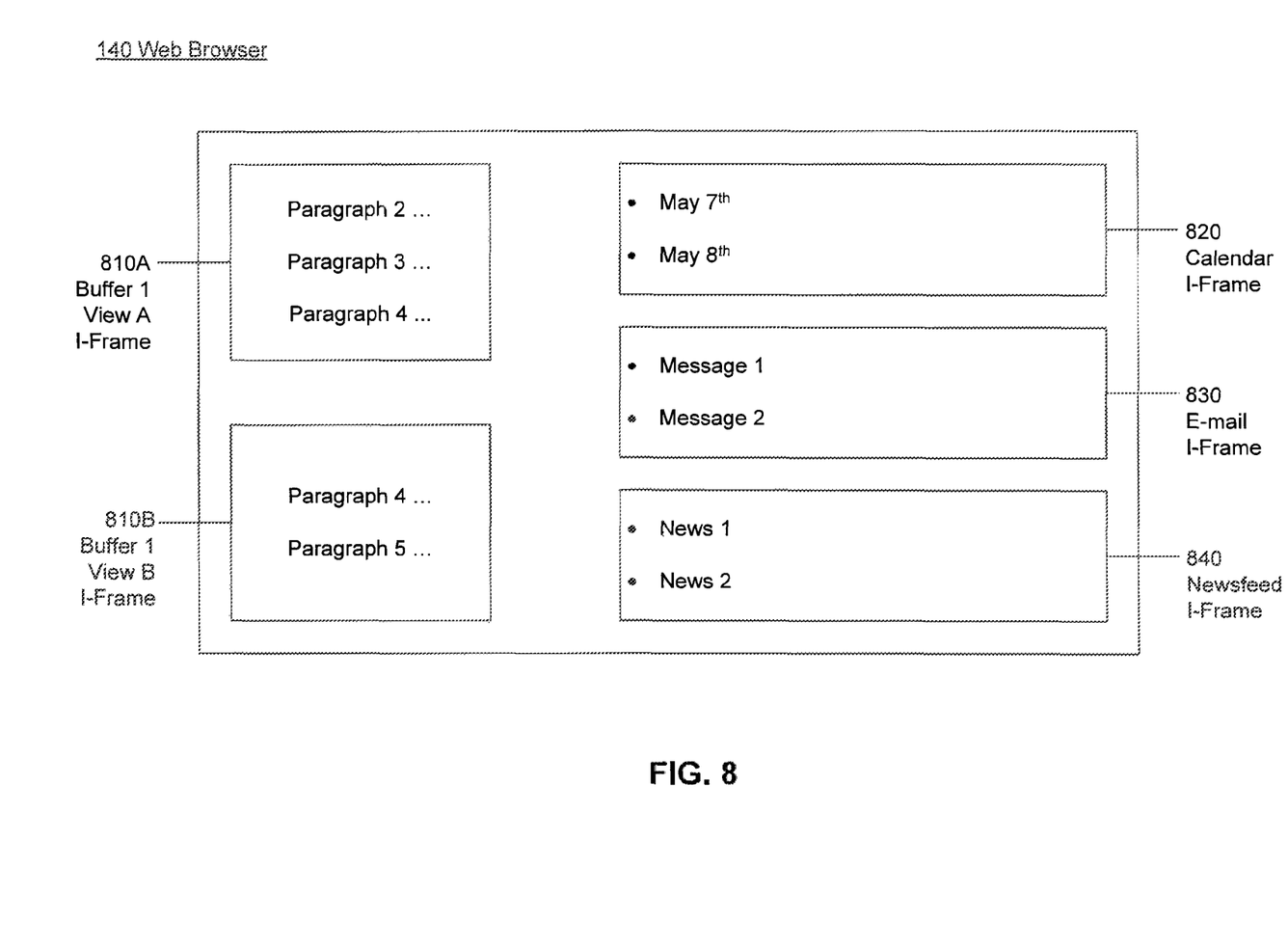
FIG. 8 illustrates an example web browser with an assortment of i-frames.

As discussed previously, one of the inline frames may display a web service. In various embodiments, sample web services may include a calendar, an e-mail account, or a newsfeed. FIG. 8 illustrates an example web browser 140 with an assortment of i-frames. For example, 810A and 810B are i-frames that provide views of a first buffer, where the first buffer is a single document. As can be seen in FIG. 8, view 810A shows paragraphs 2-4 of the first buffer and view 810E shows paragraphs 4-5 of the first buffer. As the user edits and views the first buffer in one of its view, i-frame updater updates the first buffer in the background. View 810A and view 810B display different views of the same buffer (i.e., different parts of the same document are shown in view 810A and view 810B) but the buffer remains up-to-date as it changes. The different views also reflect the evolving nature of the buffer, displaying changes as they are made. Additionally, a variety of web services are displayed in FIG. 8. Some example web services are a calendar i-frame 820, an e-mail i-frame 830, and a newsfeed i-frame 840.

Advantageous Features

The disclosed embodiments represent a significantly improved means of managing web information access. By using inline frames, multiple windows may offer multiple views of multiple buffers simultaneously in a highly flexible manner, as well as simultaneously offering access to web services. Additionally, because the functionality is implemented through inline frames, no special plug-in or functionality is required beyond the use of inline frames. Thus, any browser that implements inline frames may act as part of an embodiment and facilitate web information access in an easy, flexible way that ensures optimal use of screen real estate.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A computer-implemented method for managing web information access, comprising:

dividing a web browser window into a plurality of inline frames, the plurality of inline frames being defined by markup language instructions provided in a master frame web page, the markup language instructions in the master frame web page partitioning the screen space available in the web browser window into the plurality of inline frames;

accessing a first content web page from a web server;

displaying a view of the first content web page in a first inline frame of the master frame web page;

displaying at least one of a different view of the first content web page, a second content web page, and a web service frame in a second inline frame of the master frame web page;

displaying, in a frame list inline frame of the master frame web page, a list of the web documents of which views are provided by inline frames in the master frame web page other than the frame list inline frame, wherein the frame list inline frame allows the user access to the web documents; and updating the inline frames based on the markup language instructions so as to keep current at least one of the content web pages, the views of the content web pages, or the web service frame as a user interacts with the inline frames of the master frame web page.

2. The computer-implemented method of claim 1, wherein the markup language is HTML 4.01 or HTML 5.

3. The computer-implemented method of claim 1, wherein displaying web content in the inline frames comprises:

displaying the inline frames as initially minimized; and resizing the inline frames to allocate screen space to each inline frame.

4. The computer-implemented method of claim 1, wherein displaying web content in a selected one of the inline frames comprises:

displaying the selected one of the inline frames as maximized; and minimizing all other inline frames to accommodate the maximized inline frame.

5. The computer-implemented method of claim 1, further comprising:

receiving an instruction to split an inline frame by dividing it into two smaller frames, whose size is set manually, on a horizontal or vertical basis.

6. The computer-implemented method of claim 1, further comprising splitting an inline frame automatically, such that the frame splits available screen space on a horizontal or vertical basis.

7. The computer-implemented method of claim 1, further comprising automatically splitting inline frames, such that there is a primary frame of a set size and the other frames divide any additional screen space.

8. The computer-implemented method of claim 1, further comprising navigating the contents of inline frames and loading new inline frames using a command-line interface.

9. The computer-implemented method of claim 1, wherein the web service is a calendar, an e-mail account, or a newsfeed.

10. A system for managing web information access, comprising:
- a web page display module implemented on a computing device and configured to divide a web browser window into a plurality of inline frames, the plurality of inline frames being defined by markup language instructions provided in a master frame web page, the markup language instructions in the master frame web page partitioning the screen space available in the web browser window into the plurality of inline frames;
- a web page access module implemented on the computing device and configured to access a first content web page from a web server;
- an i-frame manager implemented on the computing device and configured to display a view of the first content web page in a first inline frame of the master frame web page and further configured to display at least one of a different view of the first content web page, a second content web page, and a web service frame in a second inline frame of the master frame web page and further configured to display, in a frame list inline frame of the master frame web page, a list of the web documents of which views are provided by inline frames in the master frame web page other than the frame list inline frame, wherein the list allows the user access to the web documents; and
- an i-frame updater implemented on the computing device and configured to update the inline frames based on the markup language instructions so as to keep current at least one of the content web documents, the views of the content web pages, or the web service frame as a user interacts with the content in the inline frames.

11. The system of claim 10, wherein the markup language is HTML 4.01 or HTML 5.

12. The system of claim 10, wherein the i-frame manager is configured to display the inline frames as initially minimized and is configured to resize the inline frames to allocate screen space to each inline frame.

13. The system of claim 10, wherein the i-frame manager is configured to display a selected one of the inline frames as maximized and is configured to minimize the other inline frames to accommodate the maximized inline frame.

14. The system of claim 10, wherein the i-frame manager is configured to receive an instruction to split an inline frame by dividing it into two smaller frames, whose size is set manually, on a horizontal or vertical basis.

15. The system of claim 10, wherein the i-frame manager is configured to split inline frames automatically, such that frames split available screen space on a horizontal or vertical basis.

16. The system of claim 10, wherein the i-frame manager is configured to split inline frames automatically, such that there is a primary frame of a set size and the other frames divide any additional screen space.

17. The system of claim 10, further comprising a command-line interface that is configured to allow navigating the contents of inline frames and loading new inline frames.

18. The system of claim 10, wherein the web service is a calendar, an e-mail account, or a newsfeed.

19. A computer-readable storage medium having instructions stored therein that, when executed by one or more processing devices, cause the processing devices to execute a method for managing web information access, the method comprising:
- dividing a web browser window into a plurality of inline frames, the plurality of inline frames being defined by markup language instructions provided in a master frame web page, the markup language instructions in the master frame web page partitioning the screen space available in the web browser window into the plurality of inline frames;
- accessing a first content web page from a web server;
- displaying a view of the first content web page in a first inline frame of the master frame web page;
- displaying at least one of a different view of the first content web page, a second content web page, and a web service frame in a second inline frame of the master frame web page;
- displaying, in a frame list inline frame of the master frame web page, a list of the web documents of which views are provided by inline frames in the master frame web page other than the frame list inline frame, wherein the frame list inline frame allows the user access to the web documents; and
- updating the inline frames based on the markup language instructions so as to keep current at least one of the content web pages, the views of the content web pages, or the web service frame as a user interacts with the inline frames of the master frame web page.

* * * * *